US 6,604,760 B2

(12) United States Patent
Cresswell et al.

(10) Patent No.: US 6,604,760 B2
(45) Date of Patent: Aug. 12, 2003

(54) QUICK CONNECT/DISCONNECT COUPLING

(75) Inventors: William L. Cresswell, Chadwick, MO (US); Judah Davis, Ozark, MO (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 09/896,243

(22) Filed: Jun. 29, 2001

(65) Prior Publication Data

US 2003/0001386 A1 Jan. 2, 2003

(51) Int. Cl.[7] ................................. F16L 37/00
(52) U.S. Cl. .................. 285/305; 285/321; 285/39; 285/323
(58) Field of Search .................. 285/39, 305, 321, 285/322, 323

(56) References Cited

U.S. PATENT DOCUMENTS

| | | | |
|---|---|---|---|
| 3,177,018 A | 4/1965 | Goodwin ................. | 285/277 |
| 3,773,360 A | 11/1973 | Timbers ................. | 285/307 |
| 3,948,548 A | * 4/1976 | Voss ...................... | 285/321 |
| 4,240,654 A | 12/1980 | Gladieux ................. | 285/276 |
| 4,613,172 A | 9/1986 | Schattmaier ............. | 285/340 |
| 4,872,710 A | 10/1989 | Konecny et al. .......... | 285/81 |
| 4,884,829 A | * 12/1989 | Funk et al. .............. | 285/39 |
| 4,948,175 A | * 8/1990 | Bartholomew ............ | 285/39 |
| 5,074,598 A | * 12/1991 | Masseth et al. .......... | 285/39 |
| 5,226,682 A | 7/1993 | Marrison et al. ......... | 285/308 |
| 5,261,638 A | 11/1993 | Onishi et al. ............ | 251/149 |
| 5,419,594 A | 5/1995 | Nelms ..................... | 285/315 |
| 5,553,895 A | 9/1996 | Karl et al. ............... | 285/39 |
| 5,570,910 A | 11/1996 | Highlen ................... | 285/308 |
| 5,685,575 A | * 11/1997 | Allread et al. ........... | 285/39 |
| 5,707,085 A | * 1/1998 | Kubiak .................... | 285/321 |
| 5,979,946 A | * 11/1999 | Petersen et al. .......... | 285/305 |
| 6,065,779 A | * 5/2000 | Moner et al. ............. | 285/39 |
| 6,145,887 A | 11/2000 | Cambot-Courrau | |
| 6,186,557 B1 | 2/2001 | Funk ...................... | 285/39 |
| 6,305,721 B1 | * 10/2001 | Heinrichs et al. ........ | 285/39 |

FOREIGN PATENT DOCUMENTS

| | | | |
|---|---|---|---|
| DE | 19715293 | 10/1998 | |
| DE | 19932307 A1 | 1/2001 | |
| EP | 0397942 A1 | 11/1990 | |
| EP | 0982526 A1 | 3/2000 | |
| GB | 2301158 A | * 11/1996 | ........... 285/39 |

OTHER PUBLICATIONS

Copy of International Search Report from corresponding International Application PCT/US 02/20621.

* cited by examiner

Primary Examiner—Lynne H. Browne
Assistant Examiner—James M. Hewitt
(74) Attorney, Agent, or Firm—Joseph J. Pophal

(57) ABSTRACT

A coupling assembly that includes: a) a female coupling member including a cavity opening onto its receiving end, where the cavity has an annular groove; b) a male coupling member including an annular rib, the rib having a tapered leading edge, a trailing edge and a maximum diameter between the leading and trailing edges; c) a diametrically expandable locking ring carried in the annular groove of the female coupling member; and d) an annular collar slidably carried on the male coupling member axially between the trailing edge of the annular rib and the trailing end of the male coupling member, where the annular collar includes an outer circumferential surface having an outer diameter substantially equal to or greater than the maximum diameter of the annular rib and where the annular collar is slidable on the male coupling member from an unlocked position, in which the collar is positioned axially against the annular rib providing a relatively smooth circumferential surface from the trailing edge of the annular rib to the axially extending portion of the cam surface of the annular collar to a locked position, in which the collar is axially spaced from the annular rib to provide an annular gap axially between the collar and the annular rib, where the annular gap is dimensioned for receiving at least a portion of at least a partially contracted locking ring therein.

48 Claims, 8 Drawing Sheets

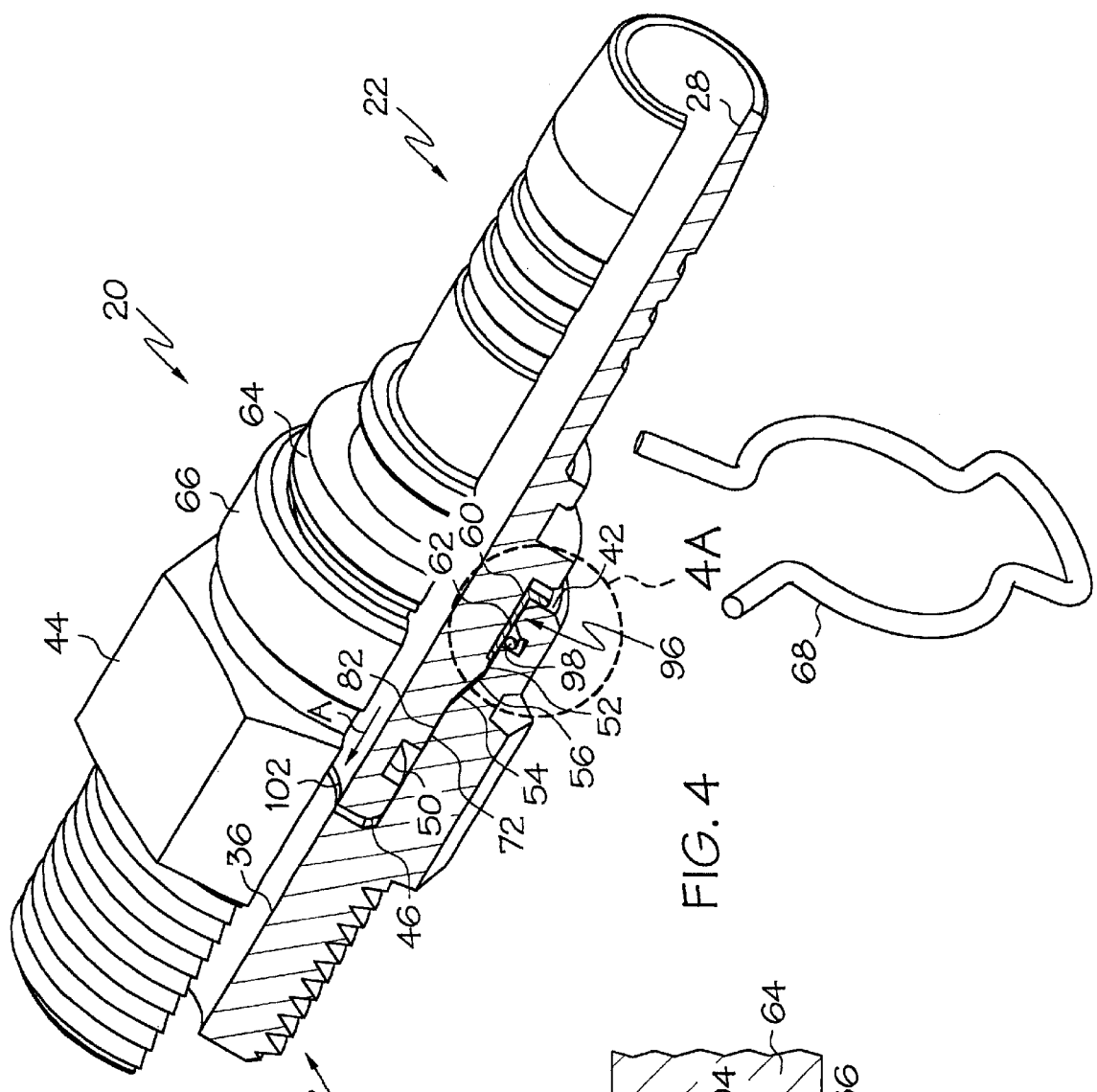
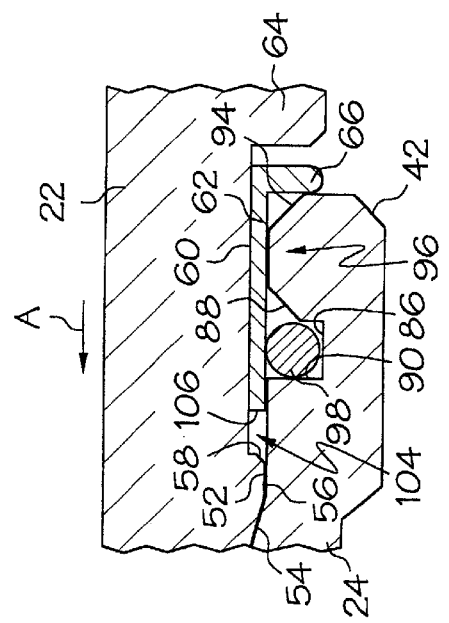
FIG. 4
FIG. 4A

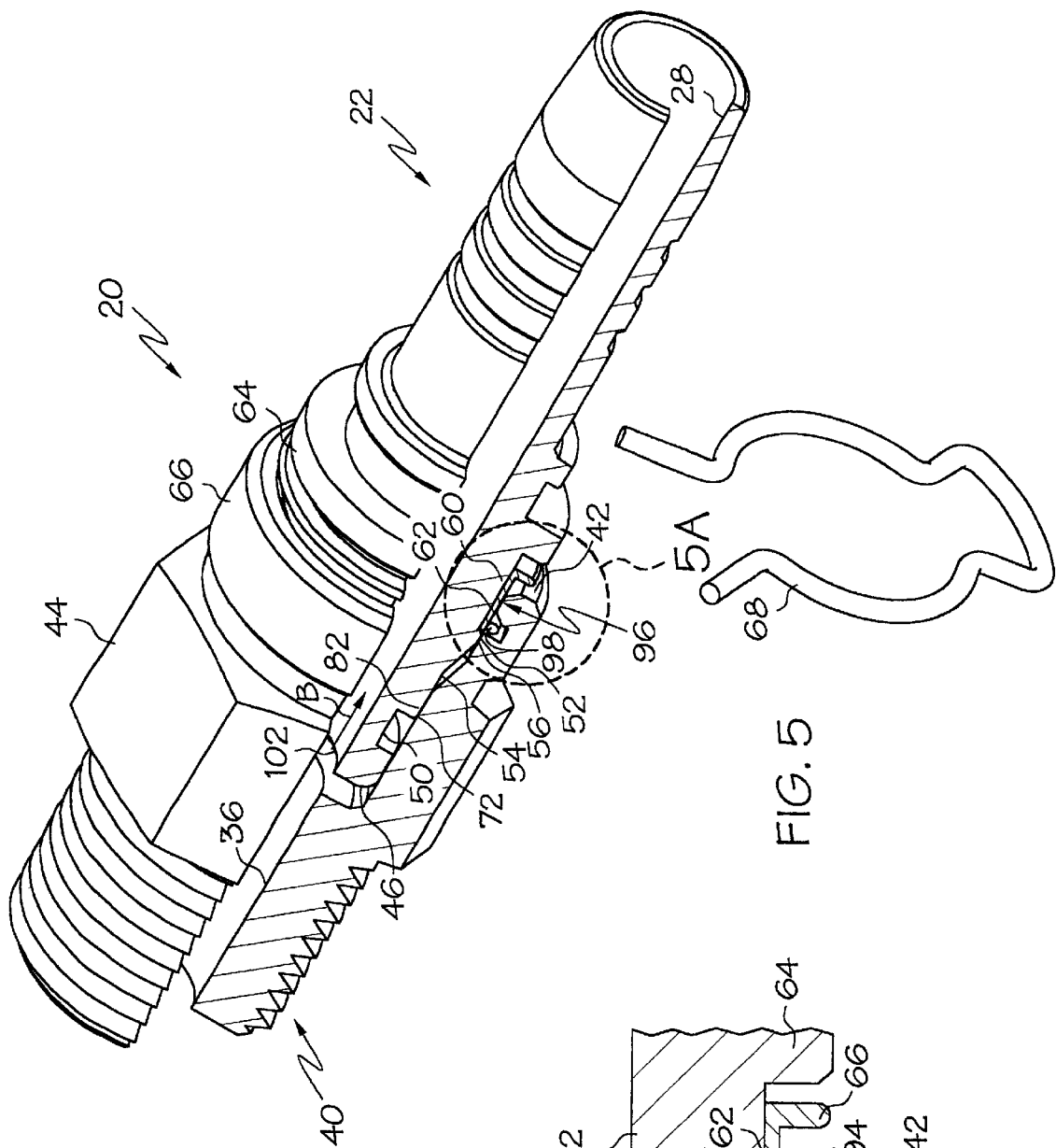
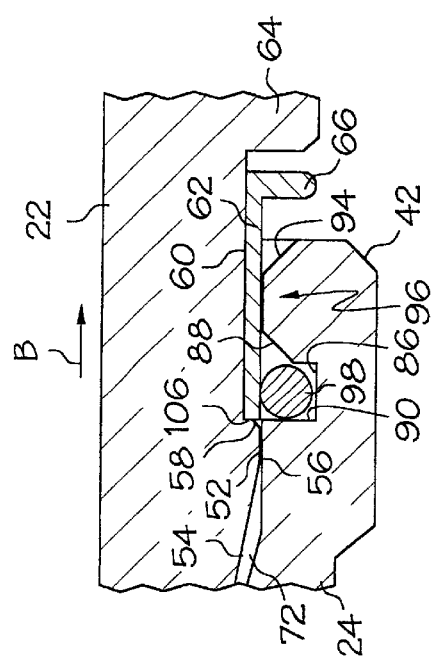
FIG. 5
FIG. 5A

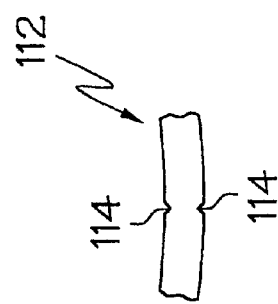
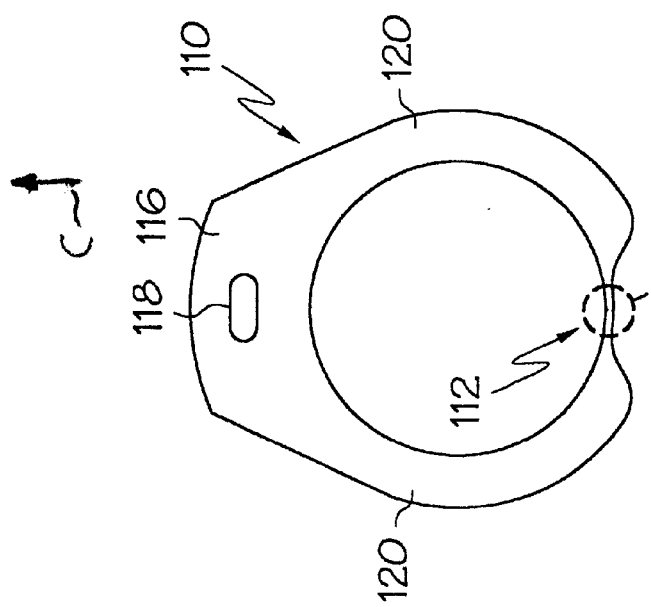
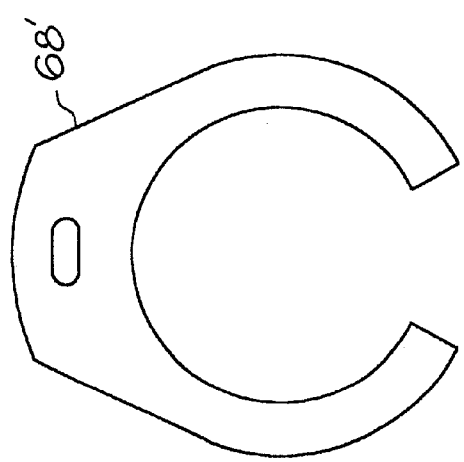

QUICK CONNECT/DISCONNECT COUPLING

BACKGROUND OF THE INVENTION

The present invention is directed to a quick connect/disconnect coupling and more specifically, to a quick connect/disconnect hydraulic or pneumatic hose coupling that utilizes a diametrically expandable locking ring (such as a split ring) within the female coupling member to maintain a locking arrangement between the male and female coupling members, and a release mechanism designed for simple and efficient decoupling of the male and female members that does not require the use of proprietary tools.

SUMMARY

A first aspect of the present invention is directed to a coupling assembly that includes: a) a female coupling member including a cavity opening onto its receiving end, where the cavity has an annular groove; b) a male coupling member including an annular rib, where the rib has a tapered leading edge, a trailing edge and a maximum diameter between the leading and trailing edges; c) a diametrically expandable locking ring carried in the annular groove of the female coupling member, where the locking ring has an un-expanded inner diameter that is less than the maximum diameter of the annular rib on the male coupling member, and where the locking ring is diametrically expandable to have an inner diameter that is at least slightly larger than the maximum diameter of the annular rib; and d) a cam surface extending radially outwardly from the male coupling member and positioned axially between the trailing edge of the rib and trailing end of the male coupling member, where the cam surface has a radial height substantially equal to or greater than the radial height of the annular rib on the male coupling member at the maximum diameter of the annular rib. The male coupling member is dimensioned for insertion into the cavity of the female coupling member to a locking position in which the trailing edge of the annular rib passes the receiving-side edge of the annular groove in the female coupling member. Whereupon insertion of the male coupling member into the cavity of the female coupling member to the locking position, the tapered leading edge of the annular rib on the male coupling member contacts the inner surface of the locking ring, causing the locking ring to diametrically expand as the locking ring advances towards the trailing edge of the annular rib and upon passing the trailing edge of the annular rib, the locking ring contracts again and is maintained in a locking state between the trailing edge of the annular rib and the receiving side edge of the annular groove. The male coupling member is further dimensioned for selective axial movement inwardly towards the distal end of the female coupling member, from the locking position to an unlocking position. With such movement of the male coupling member to the unlocking position the cam surface passes the receiving side edge of the annular groove. Whereupon movement of the male coupling member from the locking position to the unlocking position, the cam surface extending radially outwardly from the male coupling member contacts the locking ring and diametrically expands the locking ring again so that the annular rib of the male coupling member may pass back again by the locking ring during removal of the male coupling member from the female coupling member.

In a more detailed embodiment, the coupling further includes an annular collar carried on the male coupling member, where the annular collar includes the cam surface. In a further detailed embodiment, the annular collar is axially slidable along the male coupling member. In yet a further detailed embodiment, the coupling assembly further includes a first retainer that retains the cam surface of the annular collar and axial alignment with the annular groove of the female coupling member as the male coupling member is being removed from the female coupling member, at least until the trailing edge of the rib on the male coupling member passes back beyond the receiving-side edge of the annular groove in the cavity of the female coupling member. In yet a further detailed embodiment, the cam surface of the annular collar includes a leading edge for contacting the locking ring and an axially extending portion for maintaining the locking ring in the diametrically expanded state, and the first retainer is the locking ring contracting against the axially extending portion of the cam surface of the annular collar, thereby frictionally or mechanically retaining the annular collar in axial position as the male coupling member is being removed from the female coupling member, until the annular rib of the male coupling member contacts the annular collar and carries the annular collar out with the male coupling member.

In yet a further detailed embodiment, the collar is slidable on the male coupling member from an unlocked position, in which the collar is positioned axially against the annular rib providing a relatively smooth circumferential transition surface from the trailing edge of the annular rib to the axially extending portion of the cam surface of the annular collar, to a locked position, in which the collar is axially spaced from the annular rib to provide an annular gap axially between the collar and the annular rib, into which the locking ring can (at least partially) diametrically contract into the locking state between the trailing edge and the receiving side edge of the annular groove.

In yet a further detailed embodiment, the coupling assembly further includes a releaseable second retainer for selectively retaining the collar in the locked position. In yet a further detailed embodiment, this releaseable, second retainer is a clip removably coupled to either the male coupling member or the collar, and is adapted to contact the receiving edge of the female coupling member so as to prohibit the male coupling member from being selectively moved axially to the unlocking position within the female coupling member. In an even further detailed embodiment, the collar includes a first radially outwardly extending flange positioned axially distal from the leading edge of the cam surface on the collar, the male coupling member includes a second radially outwardly extending flange positioned on a trailing edge side of the collar, the clip is removably coupled to the collar on a leading edge side of the first radially outwardly extending flange, and the clip is adapted to be maintained between the receiving end of the female coupling member and the first radially outwardly extending flange of the collar and the second radially outwardly extending flange is adapted to contact the trailing edge side of the collar, thereby preventing the collar from sliding axially beyond the second radially outwardly extending flange.

It is a second aspect of the present invention to provide a coupling assembly that includes: a) a female coupling member including a cavity opening onto its receiving end, where the cavity has an annular groove; b) a male coupling member including annular rib, the rib having a tapered leading edge, a trailing edge and a maximum diameter between the leading and trailing edges; c) a diametrically expandable locking ring carried in the annular groove of the female coupling member, where the locking ring has an un-expanded inner diameter that is less than the maximum diameter of the annular rib on the male coupling member, and the locking ring is diametrically expandable to have an inner diameter that is at least slightly larger than the maximum diameter of the annular rib on the male coupling member; and d) an annular collar slidably carried on the male coupling member axially between the trailing edge of the annular rib and the trailing end of the male coupling member, where the annular collar includes an outer circumferential surface having an outer diameter substantially equal to or greater than the maximum diameter of the annular rib and where the annular collar is slidable on the male coupling member from an unlocked position, in which the collar is positioned axially against the annular rib providing a relatively smooth circumferential surface from the trailing edge of the annular rib to the axially extending portion of the cam surface of the annular collar to a locked position, in which the collar is axially spaced from the annular rib to provide an annular gap axially between the collar and the annular rib, where the annular gap is dimensioned for receiving at least a portion of at least a partially contracted locking ring therein. The male coupling member is dimensioned for insertion into the cavity of the female coupling member to a locking position in which the trailing edge of the annular rib passes the receiving side edge of the annular groove in the female coupling member. Whereupon insertion of the male coupling member into the cavity of the female coupling member to a locking position, the tapered leading edge of the annular rib on the male coupling member contacts the inner surface of the locking ring, causing the locking ring to diametrically expand as the locking ring advances toward the trailing edge of the annular rib, and upon passing the trailing edge of the annular rib to the annular gap axially between the collar in the annular rib, the locking ring contracts again and is maintained in a locking state between the trailing edge of the annular rib and the receiving side edge of the annular groove. The male coupling member is further dimensioned for selective axial movement inwardly in towards the distal end of the female coupling member, from the locking position to an unlocking position. In the unlocking position, the outer circumferential surface of the annular collar is moved into axial alignment with the annular groove in the female coupling member. Therefore, upon movement of the male coupling member from the locking position to the unlocking position, the annular collar contacts the locking ring and diametrically expands the locking ring again so that the annular rib of the male coupling member may pass back again by the locking ring.

In a further detailed embodiment of the second aspect of the present invention, the coupling assembly further includes a stop positionable to a blocking position inhibiting the male coupling member from moving from the locking position to the unlocking position. In yet a further detailed embodiment, the stop is positionable to the blocking position axially between the receiving end of the female coupling member and a projection extending radially outwardly from either the male coupling member or the collar. In yet a further detailed embodiment, the projection is an annular flange. In yet a further detailed embodiment, the stop is a removable clip.

In an alternate detailed embodiment of the second aspect of the present invention the stop is positionable to the blocking position axially between the receiving end of the female coupling member and an annular flange extending radially outwardly from the collar.

In yet another alternate detailed embodiment of the second aspect of the present invention, the coupling assembly further includes a retainer for retaining the annular collar in axial alignment with the annular groove in the female coupling member as the male coupling member is being removed from the female coupling member at least until the trailing edge of the rib on the male coupling member passes the receiving side edge of the annular groove in the cavity of the female coupling member. In yet a further detailed embodiment, the retainer is the locking ring contracting against the outer circumferential surface of the collar. In yet a further detailed embodiment, the coupling assembly further includes a stop positionable to a blocking position inhibiting the male coupling member from moving from the locking position to the unlocking position. In yet a further detailed embodiment, the stop is positionable to the blocking position axially between the receiving end of the female coupling member and projection extending radially outwardly from either the male coupling member or the collar. In yet a further detailed embodiment, the projection is an annular flange. In yet an even further detailed embodiment, the stop is a removable clip, such as a C clip. In yet an even further detailed embodiment, the annular flange extends radially outwardly from the collar. In yet an even further detailed embodiment, the male coupling member includes an abutment extending radially outwardly therefrom to limit movement of the collar towards the trailing end of the male coupling member. In yet an even further detailed embodiment, this abutment is an annular flange extending radially outwardly from the male coupling member. In yet an even further detailed embodiment, the annular rib on the male coupling member includes a shoulder at the trailing edge of the annular rib, where the shoulder is substantially normal to an axis of the male coupling member. In yet a further detailed embodiment, the locking ring is an annular split ring, where the split ring comprises a length of spring material formed into a ring, where the length of spring material includes a cross-sectional radius. In yet a further detailed embodiment, the leading end of the annular collar has a radial height that is less than the cross-sectional radius of the length of spring material comprising the annular split ring; therefore, as the male coupling member is moved inwardly to the unlocking position, the leading end of the annular collar contacts the annular split ring lifting the annular split ring radially outwardly substantially into the annular groove in the male coupling member.

In another alternate embodiment of the second aspect of the present invention, the male and female coupling members include fluid channels extending axially completely therethrough. In yet a further detailed embodiment, the male and female coupling members are hydraulic coupling members and the fluid channels are, therefore, hydraulic fluid channels.

In yet a further alternate detailed embodiment of the second aspect of the present invention, the male coupling member includes a first stop positioned on a trailing edge side of the annular collar and the first stop retains the annular collar in axial position with respect to the male coupling member as the male coupling member is being inserted into the locking position. In a further detailed embodiment, this first stop is a projection extending radially outwardly from the male coupling member. In yet a further detailed embodiment, this projection is an annular flange. In yet an even further detailed embodiment, the coupling assembly further includes a retainer for retaining the annular collar in axial alignment with the annular groove in the female coupling member as the male coupling member is being removed from the female coupling member, at least until the trailing edge of the rib passes the receiving side edge of the annular groove in the cavity of the female coupling member. In yet a further detailed embodiment, the coupling assembly further includes a second stop positionable to a blocking position inhibiting the male coupling member from moving from the locking position to the unlocking position. In yet a further detailed embodiment, the second stop is positionable to the blocking position axially between the receiving end of the female coupling member and a projection extending radially outwardly from either the male coupling member or the collar. In yet a further detailed embodiment, this projection is an annular flange extending radially outwardly from the collar. In yet a further detailed embodiment, the second stop is a removable clip.

In yet another alternate detailed embodiment of the second aspect of the present invention, the annular rib on the male coupling member includes a shoulder at the trailing edge of the annular rib, where the shoulder is substantially normal to an axis of the male coupling member. In yet a further detailed embodiment, the locking ring is an annular split ring, which comprises a length of spring material formed into a ring, where the length of spring material has a cross-sectional radius. In yet a further detailed embodiment, the leading end of the annular collar has a radial height that is less than the cross-sectional radius of the length of spring material comprising the annular split ring; therefore, as the male coupling member is moved inwardly to the unlocking position, the leading end of the annular collar contacts the split ring, lifting the annular split ring radially outwardly substantially into the annular groove in the female coupling member.

BRIEF DESCRIPTION OF THE DRAWINGS

FIG. 3a is a magnified view of a section of FIG. 3;

FIG. 4 is a perspective and partially cross-sectional view of the exemplary embodiment of the quick connect/disconnect mechanism of the present invention, illustrating the male and female coupling members advanced to the unlocking configuration;

FIG. 4a is a magnified view of a section of FIG. 4;

FIG. 5 is a perspective and partially cross-sectional view of the exemplary embodiment of the quick connect/disconnect mechanism of the present invention, illustrating the male and female coupling members being drawn apart from one another from the unlocked configuration;

FIG. 5a is a magnified view of a section of FIG. 5;

FIG. 7 is an elevational end view of an alternate C-clip for use with the present invention;

FIG. 8 is an elevational end view of another alternative C-clip having a break-away portion;

FIG 8a is a magnified view of the break-away portion in FIG. 8;

DETAILED DESCRIPTION

Figure 1:
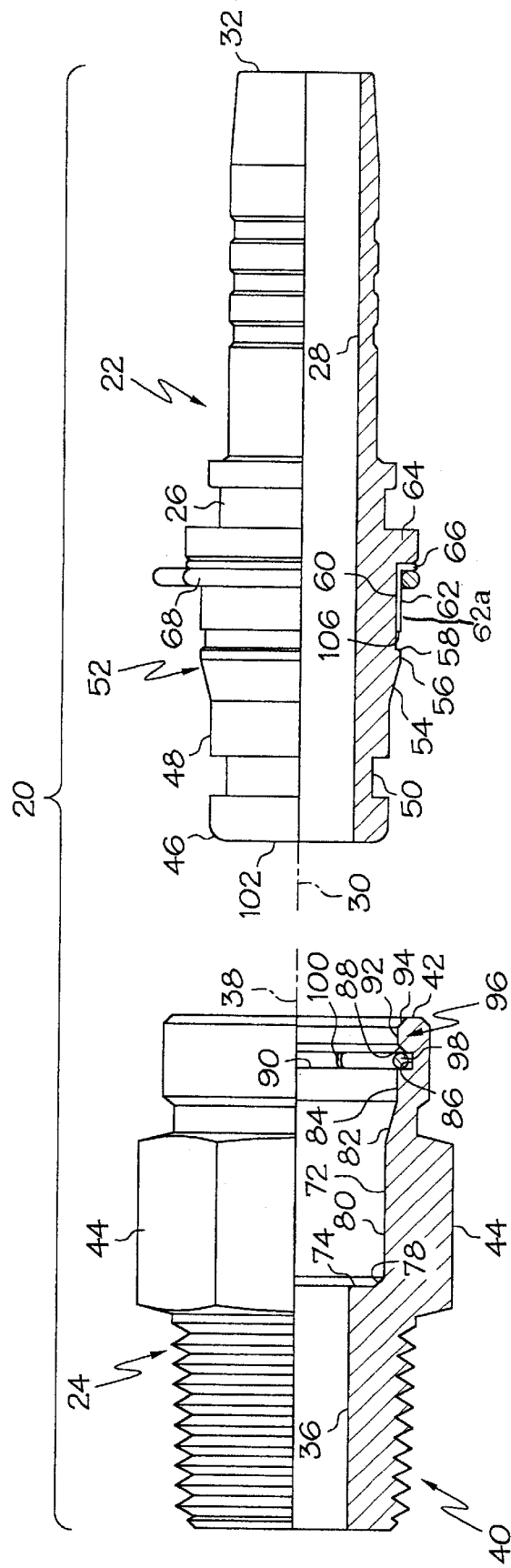
FIG. 1 is an elevational and partially cross-sectional view of the exemplary embodiment of the quick connect/disconnect mechanism of the present invention, illustrating the male and female coupling members in a decoupled configuration.
Figure 2:
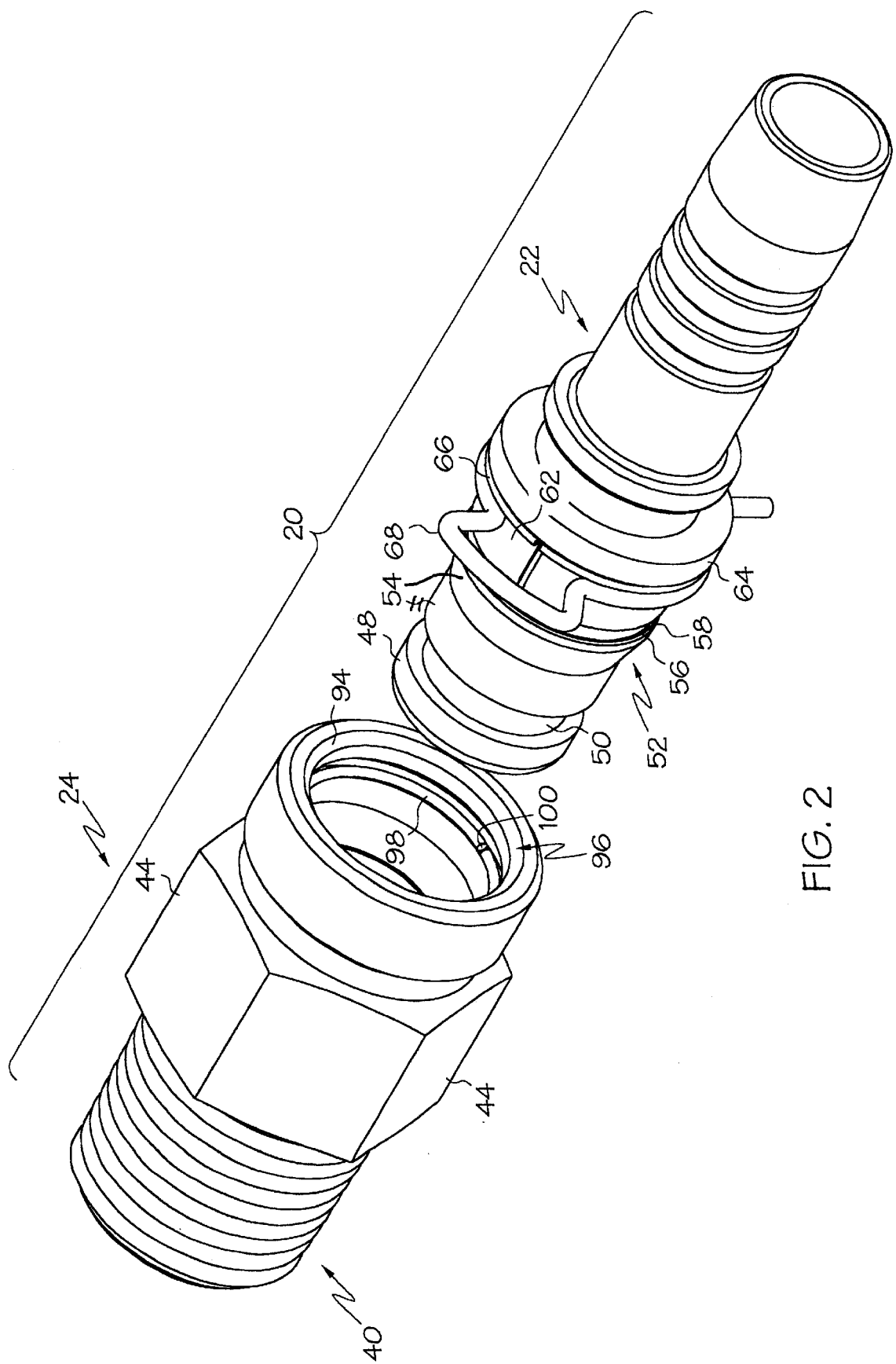
FIG. 2 is a perspective view of the male and female coupling members of the exemplary embodiment in the decoupled configuration.

As shown in FIGS. 1 and 2, an exemplary embodiment of a quick connect/disconnect mechanism according to the present invention is a hydraulic hose fitting assembly 20 designed and dimensioned to meet the SAE J517-Series 100R12 pressure standard. The assembly 20 includes a male coupling member 22 adapted for fitting a hydraulic hose (not shown) thereon and a female coupling member 24 adapted to be attached to a hydraulic fluid source, receptacle or passage. The male coupling member 22 includes a generally cylindrical body 26 having a cylindrical conduit or passage 28 extending completely therethrough along a central axis 30 of the male coupling member 22. Mounted to the trailing end 32 of the generally cylindrical body may be a ferrule (not shown) of conventional design which would be adapted to attached a hydraulic hose (not shown) to the trailing end 32 of the cylindrical body 26.

The female coupling member 24 also includes a conduit 36 extending completely therethrough along a central axis 38 thereof for providing passage of the hydraulic fluid therethrough. The distal end 40 of the female coupling member 24 is threaded for mounting the female coupling member 24 to a hydraulic fluid source, receptacle or passage as known to those of ordinary skill in the art. Between the receiving end 42 and a distal end 40 of the female coupling member 24 is provided a plurality of circumferentially distributed flats 44 that define a hexagonal cross-section for engagement by an appropriate tool such as a wrench, to install the female coupling member 24 to the appropriate hydraulic fluid receptacle, source or passage.

The generally cylindrical body 26 of the male coupling member 22 includes a tapered leading edge 46 immediately trailed by a cylindrical surface 48 that includes a circumferential groove 50 provided therein for receiving appropriate seals, such as an O-ring seal and/or a back-up washer (not shown). The cylindrical surface 48 is trailed by an annular rib 52 that includes a ramped leading edge 54, immediately trailed by a substantially cylindrical surface 56 at its maximum diameter and a trailing edge shoulder 58 that is substantially normal to the axis 30 and substantially perpendicular to the surface 56. The ramped leading edge 54, in this exemplary embodiment, is angled with respect to the axis at a 15° angle. It would be apparent that alternate angles are possible for this ramped leading edge 54, however, it is preferred, but not required, that the ramped leading edge 54 be angled with respect to the axis 30 at an angle ranging from 8° to 20°. Trailing the annular rib 52 is a substantially cylindrical surface 60 for slidably receiving an annular collar 62 thereon. The purpose and operation of this annular collar 62 will be described in further detail below. Trailing the circumferential surface 60 is an annular flange 64 extending radially outwardly from the generally cylindrical body 26 of the male coupling member 22. The collar 62 is axially captured on the cylindrical surface 60 by and between the shoulder 58 of the annular rib 52 and the flange 64 which acts as a first stop for collar 62.

The annular collar 62 has an axially extending outer contacting surface 62a. The trailing end of the collar 62 includes a flange 66 extending radially outwardly therefrom. A removable C clip 68 acts as a retainer and is clipped onto the collar 62 so as to circumscribe an outer circumferential surface of the collar adjacent to the flange 66.

The female coupling member 24 includes a receiving cavity 72 extending into the receiving end 42 and coaxial with the center axis 38. This cavity 72 is sized and dimensioned for receiving and securing the leading end of the male coupling member 22 therein. As will be described in detail below, the axial length of the cavity 72 also allows for axial movement of the male coupling member 22 from a locked position to an unlocking position within the cavity. Nevertheless, the cavity 72 includes an end shoulder 74 facing the male coupling member within the cavity 72. An outwardly angled conical surface 78 extends from the end shoulder 74 to match the tapered leading edge 46 of the male coupling member 22. A substantially flat cylindrical surface 80 extends from the conical surface 78 to receive the cylindrical surface 48 of the male coupling member, where the seals carried in the annular groove 50 are adapted to provide a substantially fluid-tight seal between the leading end of the male coupling member and the inner surface of the cavity 72 in the female coupling member. From this substantially flat surface 80 an outwardly angled conical surface 82 extends therefrom to substantially match the ramped leading edge 54 (15° angle) of the annular rib 52 on the male coupling member. This conical surface 82 thereafter extends to a cylindrical surface 84 adapted to match the circumferentially flat outer surface 56 at the maximum diameter of the annular rib 52 of the male coupling member. It is noted that this cylindrical surface 84 has an axial width that is longer than the circumferentially flat outer surface 56 at the maximum diameter of the annular rib 52 of the male coupling member, which allows the male coupling member to be moved axially from the locking position to the unlocking position within the cavity 72 as will be described in further detail below. The remainder of the cavity 72 extending from the cylindrical surface 84 to the receiving end 42 of the female coupling member 24 is particularly adapted to provide the locking engagement with the male coupling member 22.

The locking elements providing in the receiving cavity 72 of the female coupling member 24 essentially include an annular groove 86 having a tapered receiving side edge 88 (having a taper angle of 45° with respect to the axis 38 in this exemplary embodiment). The distal-side edge 90 of the annular groove 86 in this embodiment is not tapered, but provides a substantially normal surface (for example, certain embodiments have an approximate 1–2° relief angle as a manufacturing expedient). The tapered receiving side edge 88 of the annular groove 86 extends to a substantially flat cylindrical surface 92, which in turn, extends to a substantially outwardly angled conical surface 94 (which is angled at a 45° angle with respect to the axis 38 in this exemplary embodiment). The combination of surfaces 86, 88 and 92 discussed above essentially provide an inwardly extending flange 96 approximate the receiving end 42 of the female coupling member 24.

The female coupling member 24 also carries a diametrically expandable ring 98 within the annular groove 86 in the receiving cavity 82. The ring 98 is expandable from an unexpanded inner diameter that is less than the maximum diameter 56 of the annular rib 52 on the male coupling member 22, to an expanded inner diameter that is at least slightly larger than the maximum diameter 56 of the annular rib on the male coupling 22. In the exemplary embodiment, the diametrically expandable ring 98 is a split ring of spring steel that includes a cut 100 extending therethrough which allows the two ends formed by the cut to separate from one another when sufficient pressure is provided on the inner surface of the ring 98, thereby diametrically expanding the ring 98.

Figure 3:
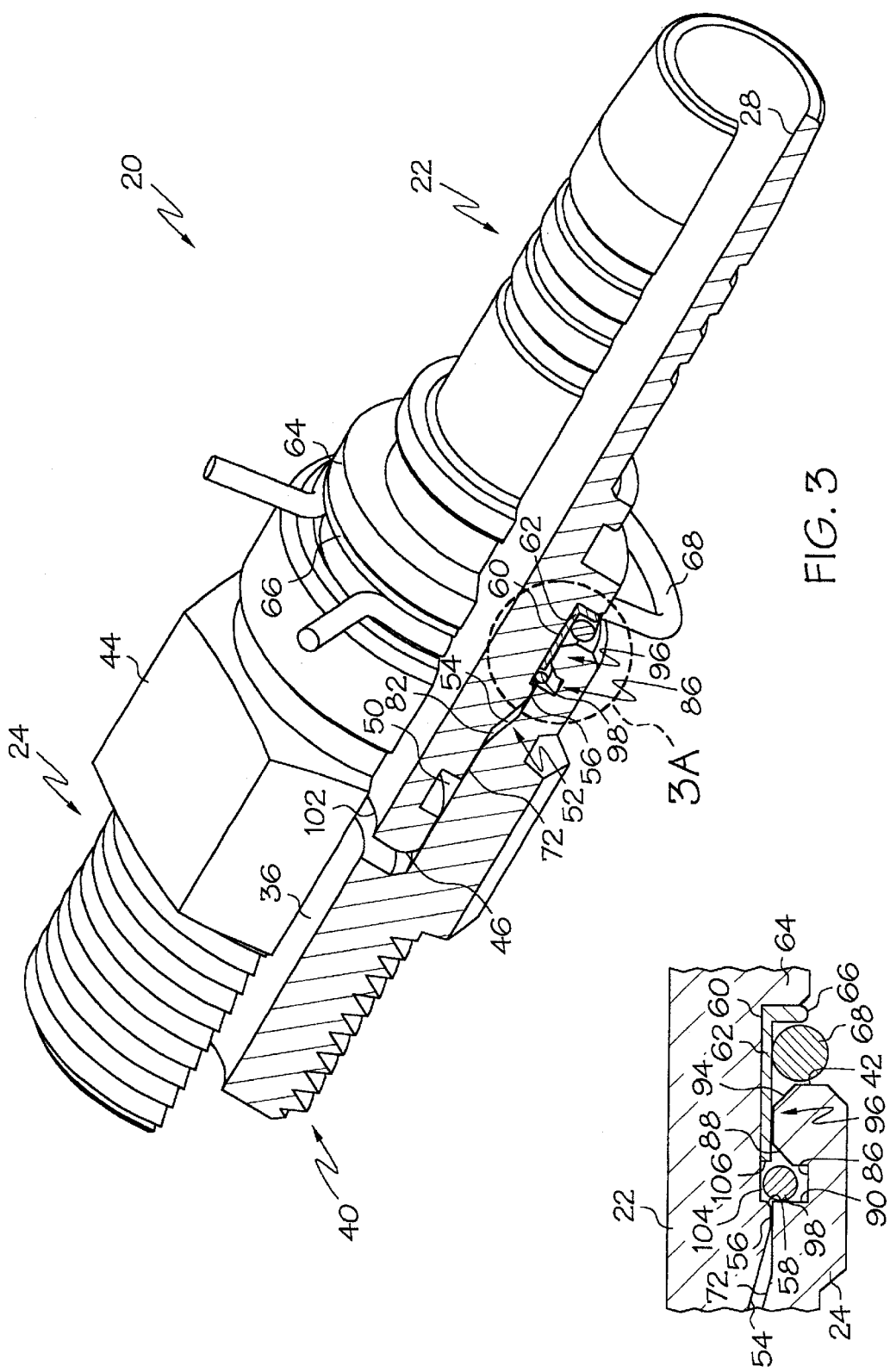
FIG. 3 is a perspective and partially cross-sectional view of the exemplary embodiment of the quick connect/disconnect mechanism in a coupled and locked configuration.

As shown in FIGS. 3 and 3a, to couple the male coupling member 22 to the female coupling member 24, the leading end 102 of the male coupling member 22 is inserted into the receiving end cavity 72 of the female coupling member such that the ramped leading edge 54 of the annular rib 52 on the male coupling member contacts the inner surface of the diametrically expandable ring 98 and causes the diametrically expandable ring 98 to diametrically expand as the ramped section 54 of the rib 52 passes through the diametrically expandable ring 98. During this expansion, the ring 98 will be maintained in axial position within the female coupling member by the annular groove 86. As the trailing edge 58 of the annular rib 52 passes past the ring 98, the ring will contract again to be maintained in a locking position (as shown best in FIG. 3a) between the trailing edge 58 of the annular rib and the receiving side edge 88 of the annular groove in the female coupling member. An annular gap 104 provided axially between the leading edge 106 of the collar 62 and the trailing edge shoulder 58 of the annular rib 52 guarantees that the ring 98 will be sandwiched between the trailing edge 58 of the rib 52 on the male coupling member and the receiving side edge 88 of the annular groove 86 in the female coupling member if one were to attempt to pull the male coupling member 28 out from the female coupling member 24 after the male coupling member has been inserted and locked into the female coupling member as shown.

Because the C clip 68 is coupled around the collar 62, it is positioned axially between the flange 66 of the collar 62 and the receiving end 42 of the female coupling member and acts as a stop, or a second stop when one of projection 64 and flange 66 is the first stop, thereby prohibiting the male coupling member 22 from any further axial movement into the cavity 72 of the female coupling member 24.

Removal of the male coupling member 22 from the female coupling member 24 is, generally, a three step process, the first two steps of which are shown by FIGS. 4 and 4a and the third step of which is shown by FIGS. 5 and 5a. As shown in FIG. 4, the first step of the removal process is to remove the C clip 68 from the male coupling member. A second step is to push the male coupling member 22 axially inwardly (as shown by arrow A) into the cavity 72 of the female coupling member such that the leading end 106 of the collar 62 contacts the split ring 98 and slides axially underneath the split ring 98, thereby diametrically expanding the split ring 98 such that the split ring 98 has an inner circumferential diameter that is substantially equal to, or slightly greater than the outer circumferential diameter of the leading end of the collar, and such that split ring 98 is received substantially entirely within the annular groove 86. This inner axial movement will continue until the ramp 54 contacts the inner conical surface 82 of the cavity 72 in the female coupling member. Alternatively, such inner axial movement may be stopped, for example, by the flange 66 on the collar contacting the receiving end 42 of the female coupling member, or by the leading end 102 of the male coupling member contacting the end shoulder 74 within the cavity 72.

Figure 6:
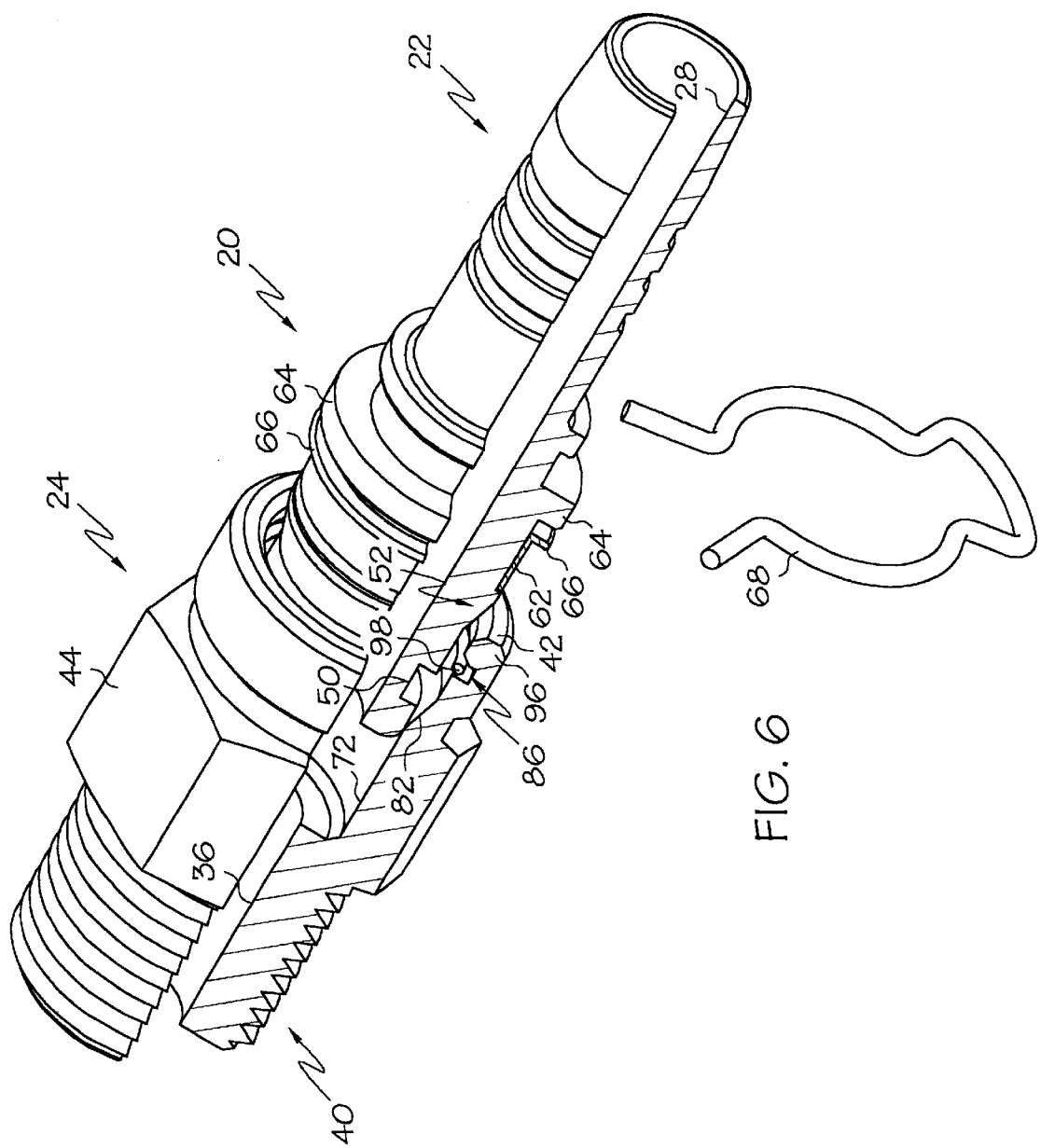
FIG. 6 is a perspective and partially cross-sectional view of the exemplary embodiment of the quick connect/disconnect mechanism, illustrating the male and female coupling members in a decoupling configuration.

As shown in FIGS. 5 and 5a, the last step of the decoupling process is to pull the male coupling member 22 out again from within the cavity 72 of the female coupling member (the direction of which is shown by arrow B). As the male coupling member is being removed from the female coupling member, the compressive and frictional forces of the ring 98 against the outer cylindrical contact surface 62*a* of the collar 62 retains the leading edge 106 of the collar in axial alignment with the ring 98 and groove 86, which in turn causes the outer circumferential surface 60 of the male coupling member 22 to slide axially in the direction shown by arrow B with respect to the collar 62 until the shoulder 58 of the annular rib 52 contacts the leading edge 106 of the collar, thereby carrying the collar 62 out with the male coupling member as the male coupling member is being removed from within the cavity 72 of the female coupling member 24. When the shoulder 58 of the rib 52 contacts the leading edge 106 of the collar 62, the annular gap 104 between the leading edge 106 and the shoulder 58 is eliminated, thereby providing a substantially smooth transition from the maximum diameter 58 of the rib 52 to the outer circumferential surface of the collar. Therefore, as the shoulder 58 carries the collar 62 out with the male coupling member 22, this substantially smooth transition between the leading edge 106 and the shoulder 58 of the rib retains the ring 98 within the cavity 86 (where the ring 98 has a inner diameter that is substantially the same as, or slightly greater than the maximum diameter 56 of the rib 52), thereby allowing the rib 52 to pass by the locking ring 98 in the direction shown by arrow B, resulting in a decoupled assembly as shown in FIG. 6. It will be understood that the "substantially smooth transition" discussed above does not require identical outer diameters between the annular rib 52 on the male coupling member and the leading edge 106 of the collar (as will be seen below with respect to alternate embodiment of the collar 62'). Essentially, for the purposes of this invention, "substantially smooth transition" requires that the differences in outer diameters between the annular rib 52 and the leading edge 106 of the collar 62 not be such that the ring 98 gets caught against a portion of the shoulder 58 rising above the collar 62 as the male coupling member 22 is being removed from the female coupling member 24, during this last step of the decoupling process, to the extent that it will not allow the male coupling member from being removed from the female coupling member without using undue force. Likewise, this same criteria applies when it is described that the outer circumferential surface at the leading end of the collar has an outer diameter that is substantially equal to or greater than the maximum diameter of the annular rib.

Figure 9A:
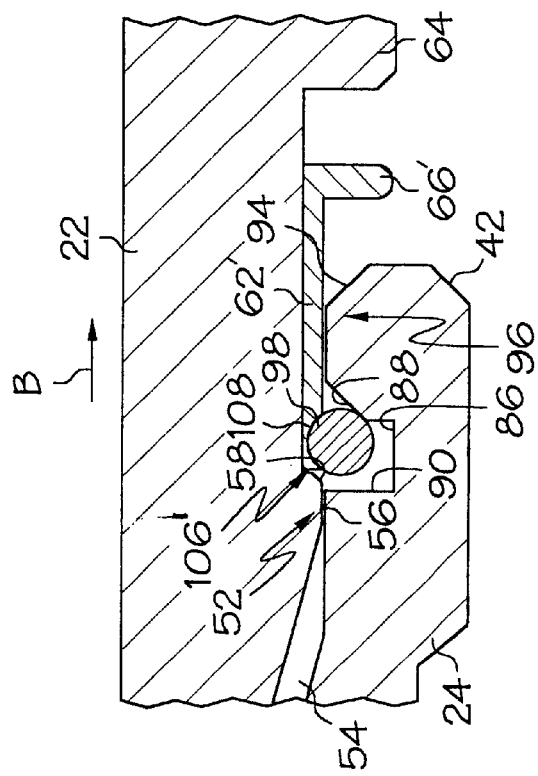
FIG. 9a is a view similar to FIG. 9 illustrating further step in drawing apart the male and female coupling members.
Figure 9:
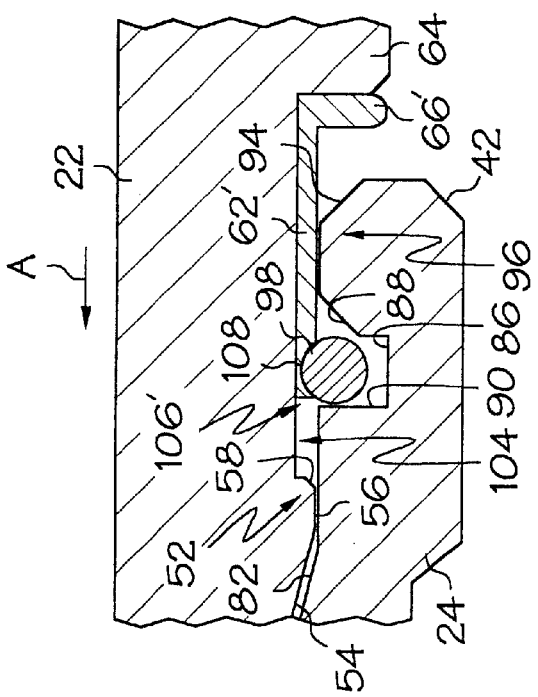
FIG. 9 is a perspective and partially cross-sectional view of another embodiment of the quick connect/disconnect mechanism of the present invention, illustrating the male and female coupling members being drawn apart from one another from the unlocked configuration.

While in the exemplary embodiment, the ring 98 applies compressive and frictional forces on the collar 62 to retain the leading end of the collar in radial alignment with the ring 98 and groove 86 as the male coupling member is being removed from the female coupling member (at least until the trailing edge of the rib passes the receiving-edge side of the annular groove in the cavity of the female coupling member), it is within the scope of the present invention that the ring 98 mechanically retain the collar in radial alignment with the ring 98 and groove 86 as the male coupling member is being removed from the female coupling member. For example, as shown in FIGS. 9A and 9B, an alternative embodiment of the annular collar 62' could be provided that includes an arcuate-shaped annular groove 108 approximate the leading end 106' of the collar. This arcuate annular groove 108 is adapted to seat the ring 98 therein, thereby creating a mechanical coupling between the ring 98 and the collar 62'. As shown in FIG. 9A, during the second step of the decoupling process, in which the male coupling member 22 is pushed axially inwardly (as shown by arrow A) into the cavity 72 of the female coupling member such that the leading end 106' of the collar 62' contacts the split ring 98 and slides axially underneath the split ring 98 to diametrically expand the split ring 98, the split ring will settle into the annular groove 108, and thus be retained within the annular groove 108. Then, during the last step of the decoupling process, in which the male coupling member 22 is pulled out again from within the cavity 72 of the female coupling member (as shown by arrow B), the collar 62' will move with the male coupling member 22 until the split ring 98 contacts the tapered receiving side edge 88 of the annular groove 86. The leading end 106' of the collar 62' will then be retained in axial alignment with the annular groove 86 as the male coupling member is slid axially in the direction of arrow B, until the trailing edge shoulder 58 of the annular rib 52 contacts the leading end 106' of the male coupling member 22 as shown in FIG. 9B. The arcuate shape and relatively low profile of the annular groove 108 allows the axial force in direction of arrow B to overcome the mechanical coupling of the split ring 98 and annular groove while the split ring 98 is maintained in axial position by the tapered receiving side edge 88 of the annular groove the collar 62'. Once this mechanical coupling is overcome, the split ring 98 will diametrically expand again so that the annular rib 52 on the male coupling member will pass by it as the male coupling member 22 and collar 62' are pulled out from the cavity 72 in the female coupling member 24.

As will be appreciated by the above description, in the exemplary embodiment, once the C clip 68 is removed from between the male coupling member and the female coupling member (if a removable stop such as the C clip 68 is used at all), decoupling of the male coupling member from the female coupling member may involve the simple steps of pushing the male coupling member further into the female coupling member and then pulling the male coupling member back out from the female coupling member. This can also be characterized by a reciprocating axial motion. Therefore, if the female coupling member is mounted to a stationary receptacle, for example, it is possible to easily decouple the male and female coupling members manually using one hand. Specifically, by gripping the male coupling member with the one hand and then, while gripping the male coupling member with the one hand, performing the above-described push-pull steps (reciprocating axial motion) to decouple the two components.

As mentioned above, the hydraulic hose fitting assembly is designed and dimensioned to meet the SAE-J517 Series 100R12 pressure standard. Such a pressure capacity is established, at least in part, by providing a locking ring 98 cross-sectional diameter adequate to resist sheer forces due to the thrust load of internal pressure in service and by providing the locking ring 98 with an inner diameter that is approximately 1.15 to approximately 1.3 times the size of the nominal outer diameter of the generally cylindrical body 26 of the male coupling assembly. This nominal outer diameter is approximately the outer diameter of the body 26 near the trailing end 32 of the body; or alternatively, it is approximately the outer diameter of the circumferential groove. It is noted, however, that the strength of the materials involved is also critical in establishing pressure capabilities, and thus, the above ratios are somewhat dependent upon the physical characteristics of the alloys of construction for the male coupling member, the female coupling member and the locking ring. Higher strength materials would not require as severe a ratio as indicated. In the exemplary embodiment, the generally cylindrical body 26 of the male coupling member is machined by 13/16 rnd. 12L14 BAR the female coupling member is machined from 15/16 hex-12L15 BAR, and the locking ring 98 is 0.051 carbon spring steel wire (dimensions in inches).

In the exemplary embodiment, the C clip 68 is a spring steel clip; however, it will be appreciated by those of ordinary skill in the art that alternate clips and materials for clips may be used. For example, as shown in FIG. 7, an alternate C clip 68' is fabricated from a plastic material, such as nylon. It will also be appreciated that other releasable retainers may be utilized in place of the clips disclosed herein while still remaining within the scope of the invention. For example, it is within the scope of the invention to use a break-away clip 110 ("one time use" clip) as shown in FIGS. 8 and 8A. The break-away clip 110 is generally in the shape of a ring having a radially narrowed break-away portion 112 that includes a pair of opposed notches or scores 114. Diametrically opposite to the narrowed break-away portion 112 is a radially thickened gripping portion 116. This gripping portion 116 may also include a hole 118 extending axially therethrough for receiving a tool or a band (such as a chain, string, wire, etc.) therein. To use, the break-away clip 110 is slid axially onto the collar 62 before coupling the male and female coupling members 22, 24 together. When it is desired to decouple the male and female coupling members 22, 24, the gripping portion 116 is pulled in a radial direction indicated by arrow C, causing the break-away portion 112 of the clip to break at the scores 114. Further pulling in direction C, causes the resilient legs 120 formed by the break to spread apart thus allowing the break-away clip 110 to be removed from the collar 62; after which is it discarded. Once the break-away clip 110 has been removed, the male and female coupling members 22, 24 may then be decoupled by the reciprocating axial motion of the male coupling member 22 with respect to the female coupling member 24 as discussed above.

While the exemplary embodiments discussed above pertain to hydraulic hose fitting assemblies, it is within the scope of the invention to utilize the quick connect/disconnect coupling for other purposes, such as, for example, providing a coupling for a pneumatic line, an electrical line or fiberoptic line. Additionally, while the exemplary embodiment is described as being particularly designed for manual coupling and decoupling, it is also within the scope of the invention that modifications can be made so as to utilize either standard or specialized tools in the coupling and/or decoupling operations.

Following from the above descriptions and summaries, it should be apparent to those of ordinary skill in the art that, while the apparatuses and processes herein described constitute exemplary embodiments of the present invention, it is to be understood that the invention does not limit it to these precise apparatuses and processes, and that changes may be made therein without departing from the scope of the invention as defined by the claims. Additionally, it is to be understood that the invention is defined by the claims and it is not intended that any limitations or elements describing the exemplary embodiments herein are to be incorporated into the meanings of the claims unless such limitations or elements are specifically listed in the claims. Finally, it is to be understood that it is not necessary to meet any or all of the stated advantages or objects of the present invention disclosed herein in order to fall within the scope of any claims, since the invention is defined by the claims and since inherent and/or unforeseen advantages of the present invention may exist even though they may not have been explicitly discussed herein.

What is claimed is:

1. A coupling assembly comprising:

a female coupling member, having a receiving end and a distal end, and including a cavity opening into the receiving end, the cavity having an annular groove, the annular groove having a receiving-side edge and a distal-side edge;

a male coupling member, having a leading end and a trailing end, and including an annular rib, the rib having a tapered leading edge, a trailing edge and a maximum diameter between the leading and trailing edges;

a diametrically expandable locking ring carried in the annular groove of the female coupling member, the locking ring having an un-expanded inner diameter that is less than the maximum diameter of the annular rib on the male coupling member, and the locking ring being diametrically expandable to have an inner diameter that is at least substantially equal to or slightly larger than the maximum diameter of the annular rib on the male coupling member; and a contact surface extending radially outwardly from the male coupling member and positioned axially between the trailing edge of the rib and the trailing end of the male coupling member, the contact surface having a radial height substantially equal to or greater than a radial height of the annular rib on the male coupling member at the maximum diameter of the annular rib;

the male coupling member being dimensioned for insertion into the cavity of the female coupling member to a locking position in which the trailing edge of the annular rib passes the receiving-side edge of the annular groove in the female coupling member, whereupon insertion of the male coupling member into the cavity of the female coupling member to the locking position, the tapered leading edge of the annular rib on the male coupling member contacts the inner surface of the locking ring, causing the locking ring to diametrically expand as the locking ring advances towards the trailing edge of the annular rib, and upon passing the trailing edge of the annular rib, the locking ring contracts again and thereafter is able to move freely in the axial direction while being maintained in a locking state between the trailing edge of the annular rib and the receiving side edge of the annular groove; and the male coupling member being further dimensioned for selective axial movement inwardly toward the distal end of the female coupling member, from the locking position to an unlocking position, in which the contact surface passes the receiving side edge of the annular groove, whereupon movement of the male coupling member from the locking position to the unlocking position, the contact surface extending radially outwardly from the male coupling member contacts the locking ring and diametrically expands the locking ring again so that the annular rib of the male coupling member may pass back again by the locking ring.

2. The coupling assembly of claim 1, further comprising an annular collar carried on the male coupling member, the annular collar including the contact surface.

3. The coupling assembly of claim 2, wherein the annular collar is axially slidable along the male coupling member.

4. The coupling assembly of claim 3, wherein said contact surface of the annular collar retains said locking ring in radial alignment with the annular groove of the female coupling member as the male coupling member is being removed from the female coupling member, at least until the trailing edge of the rib passes the receiving-edge side of the annular groove in the cavity of the female coupling member.

5. The coupling assembly of claim 4, wherein:
the contact surface of the annular collar includes a leading edge for contacting the locking ring and an axially extending portion for maintaining the locking ring in the diametrically expanded state; and
the locking ring contracts against the axially extending portion of the contact surface of the annular collar, thereby frictionally retaining the annular collar in axial position as the male coupling member is being removed from the female coupling member until the annular rib of the male coupling member contacts the annular collar and carries the annular collar out with the male coupling member.

6. The coupling assembly of claim 5, wherein the collar is slidable on the male coupling member from (a) an unlocked position in which the collar is positioned axially against the annular rib providing a relatively smooth circumferential transition surface from the trailing edge of the annular rib to the axially extending portion of the contact surface of the annular collar, to (b) a locked position in which the collar is axially spaced from the annular rib to provide an annular gap axially between the collar and the annular rib, into which the locking ring can, at least partially, diametrically contract to the locking state between the trailing edge of the annular rib and the receiving side edge of the annular groove.

7. The coupling assembly of claim 6, further comprising a releasable retainer for selectively retaining the collar in the locked position.

8. The coupling assembly of claim 7, wherein the releasable retainer is a clip removably coupled to one of the male coupling member and the collar and is adapted to contact the receiving end of the female coupling member so as to prohibit the male coupling member from being selectively moved axially to the unlocking position within the female coupling member.

9. The coupling assembly of claim 8, wherein:
the collar includes a first radially outwardly extending flange positioned axially distal from the leading edge of the contact surface on the collar;
the male coupling member includes a second radially outwardly extending flange positioned on a trailing edge side of the collar;
the clip is removably coupled to the collar on a leading edge side of the first radially outwardly extending flange; and
the clip is adapted to be maintained between the receiving end of the female coupling member and the first radially outwardly extending flange of the collar, and the second radially outwardly extending flange is adapted to contact the trailing edge side of the collar, thereby preventing the collar from sliding axially beyond the second radially outwardly extending flange.

10. The coupling assembly of claim 4, wherein:
the contact surface of the annular collar includes a leading edge for contacting the locking ring and an arcuate-shaped annular groove positioned between the leading edge and a trailing end of the annular collar; and
the first retainer is the locking ring seating within the arcuate-shaped annular groove on the annular collar, thereby mechanically retaining the annular collar in axial position as the male coupling member is being removed from the female coupling member until the annular rib of male coupling member contacts the annular collar, overcomes the mechanical coupling, and carries the annular collar out with the male coupling member.

11. The coupling assembly of claim 10, wherein the collar is slidable on the male coupling member from (a) an unlocked position in which the collar is positioned axially against the annular rib providing a relatively smooth circumferential transition surface from the trailing edge of the annular rib to the leading edge of the contact surface of the annular collar, to (b) a locked position in which the collar is axially spaced from the annular rib to provide an annular gap axially between the collar and the annular rib, into which the locking ring can, at least partially, diametrically contract to the locking state between the trailing edge of the annular rib and the receiving side edge of the annular groove.

12. A coupling assembly comprising:
a female coupling member, having a receiving end and a distal end, and including a cavity opening onto the receiving end, the cavity having an annular groove, the annular groove having a receiving-side edge and a distal-side edge;
a male coupling member, having a leading end and a trailing end, and including an annular rib, the rib having a tapered leading edge, a trailing edge and a maximum diameter between the leading and trailing edges;
a diametrically expandable locking ring carried in the annular groove of the female coupling member, the locking ring having an un-expanded inner diameter that is less than the maximum diameter of the annular rib on the male coupling member, and the locking ring being diametrically expandable to have an inner diameter that is at least substantially equal to or slightly larger than the maximum diameter of the annular rib on the male coupling member; and
an annular collar slidably carried on the male coupling member axially between the trailing edge of the annular rib and the trailing end of the male coupling member, the annular collar having a leading end and an outer circumferential surface at the leading end, the outer circumferential surface at the leading end having an outer diameter substantially equal to or greater than the maximum diameter of the annular rib, the annular collar being slidable on the male coupling member from (a) an unlocked position in which the collar is positioned axially against the annular rib providing a relatively smooth circumferential surface from the trailing edge of the annular rib to the outer circumferential surface at the leading end of the annular collar, to (b) a locked position in which the collar is axially spaced from the annular rib to provide an annular gap axially between the collar and the annular rib, the annular gap being dimensioned for receiving at least a portion of at least a partially contracted locking ring therein;
the male coupling member being dimensioned for insertion into the cavity of the female coupling member to a locking position in which the trailing edge of the annular rib passes the receiving-side edge of the annular groove in the female coupling member, whereupon insertion of the male coupling member into the cavity of the female coupling member to the locking position, the tapered leading edge of the annular rib on the male coupling member contacts the inner surface of the locking ring, causing the locking ring to diametrically expand as the locking ring advances towards the trailing edge of the annular rib, and upon passing the trailing edge of the annular rib to the annular gap axially between the collar and the annular rib, the locking ring contracts again and thereafter is able to move freely in the axial direction while being maintained in a locking state between the trailing edge of the annular rib and the receiving side edge of the annular groove; and the male coupling member being further dimensioned for selective axial movement inwardly toward the distal end of the female coupling member, from the locking position to an unlocking position, in which the outer circumferential surface at the leading end of the annular collar is moved into axial alignment with the annular groove in the female coupling member, whereupon movement of the male coupling member from the locking position to the unlocking position, the annular collar contacts the locking ring and diametrically expands the locking ring again so that the annular rib of the male coupling member may pass back again by the locking ring.

13. The coupling assembly of claim 12, further comprising a stop positionable to a blocking position inhibiting the male coupling member from moving from the locking position to the unlocking position.

14. The coupling assembly of claim 13, wherein the stop is positionable to the blocking position axially between the receiving end of the female coupling member and a projection extending radially outwardly from one of the male coupling member and the collar.

15. The coupling assembly of claim 14, wherein the projection is an annular flange.

16. The coupling assembly of claim 15, wherein the stop is a removable clip.

17. The coupling assembly of claim 16, wherein the removable clip is a c-clip.

18. The coupling assembly of claim 16, wherein the removable clip is a break-away clip.

19. The coupling assembly of claim 13, wherein the stop is positionable to the blocking position axially between the receiving end of the female coupling member and an annular flange extending radially outwardly from the collar.

20. The coupling assembly of claim 13, wherein the stop is positionable to the blocking position axially between the receiving end of the female coupling member and an annular flange extending radially outwardly from the male coupling member.

21. The coupling assembly of claim 12, wherein said outer circumferential surface of the annular collar retains said locking ring in radial alignment with the annular groove in the female coupling member as the male coupling member is being removed from the female coupling member, at least until the trailing edge of the rib passes the receiving-edge side of the annular groove in the cavity of the female coupling member.

22. The coupling assembly of claim 21, further comprising a stop positionable to a blocking position inhibiting the male coupling member from moving from the locking position to the unlocking position.

23. The coupling assembly of claim 22, wherein the stop is positionable to the blocking position axially between the receiving end of the female coupling member and a projection extending radially outwardly from one of the male coupling member and the collar.

24. The coupling assembly of claim 23, wherein the projection is an annular flange.

25. The coupling assembly of claim 24, wherein the stop is a removable clip.

26. The coupling assembly of claim 25, wherein the removable clip is a c-clip.

27. The coupling assembly of claim 25, wherein the removable clip is a break-away clip.

28. The coupling assembly of claim 25, wherein the annular flange extends radially outwardly from the collar.

29. The coupling assembly of claim 28, wherein the male coupling member includes an abutment extending radially outwardly therefrom limiting movement of the collar towards the trailing end of the male coupling member.

30. The coupling assembly of claim 29, wherein the abutment is an annular flange extending radially outwardly from the male coupling member.

31. The coupling assembly of claim 30, wherein the annular rib on the male coupling member includes a shoulder at the trailing edge of the annular rib, the shoulder being substantially normal to an axis of the male coupling member.

32. The coupling assembly of claim 31, wherein the locking ring is an annular split ring, the split ring comprising a length of spring material formed into a ring, the length of spring material having a constant cross-sectional radius.

33. The coupling assembly of claim 32, wherein the leading end of the annular collar has a radial height that is less than the cross-sectional radius of the length of spring material comprising the annular split ring, whereby as the male coupling member is moved inwardly to the unlocking position, the leading end of the annular collar contacts the annular split ring, lifting the annular split ring radially outwardly substantially into the annular groove in the female coupling member.

34. The coupling assembly of claim 21, wherein the retainer comprises a mechanical coupling between the locking ring and the collar.

35. The coupling assembly of claim 34, wherein the retainer includes an arcuate-shaped annular groove extending into an outer circumferential surface of the collar, dimensioned for receiving the locking ring therein.

36. The coupling assembly of claim 12, wherein the male and female coupling members include fluid channels extending axially completely therethrough.

37. The coupling assembly of claim 36, wherein the male and female coupling members are hydraulic coupling members.

38. The coupling assembly of claim 12, wherein:
the male coupling member includes a first stop positioned on a trailing edge side of the annular collar; and
the first stop retains the annular collar in axial position with respect to the male coupling member as the male coupling member is being inserted to the locking position.

39. The coupling assembly of claim 38, wherein the first stop is a projection extending radially outward from the male coupling member.

40. The coupling assembly of claim 39, wherein the projection is an annular flange.

41. The coupling assembly of claim 38, wherein said locking ring contracts against the outer circumferential surface of the collar, thereby frictionally retaining the annular collar in axial alignment with the annular groove in the female coupling member as the male coupling member is being removed from the female coupling member.

42. The coupling assembly of claim 38, further comprising a second stop positionable to a blocking position inhibiting the male coupling member from moving from the locking position to the unlocking position.

43. The coupling assembly of claim 42, wherein the second stop is positionable to the blocking position axially between the receiving end of the female coupling member and a projection extending radially outwardly from one of the male coupling member and the collar.

44. The coupling assembly of claim 43, wherein the projection is an annular flange extending radially outwardly from the collar.

45. The coupling assembly of claim 44, wherein the second stop is a removable clip.

46. The coupling assembly of claim 12, wherein the annular rib on the male coupling member includes a shoulder at the trailing edge of the annular rib, the shoulder being substantially normal to an axis of the male coupling member.

47. The coupling assembly of claim 46 wherein the locking ring is an annular split ring, the split ring comprising a length of spring material formed into a ring, the length of spring material having a constant cross-sectional radius.

48. The coupling assembly of claim 47, wherein the leading end of the annular collar has a radial height that is less than the cross-sectional radius of the length of spring material comprising the annular split ring, whereby as the male coupling member is moved inwardly to the unlocking position, the leading end of the annular collar contacts the annular split ring, lifting the annular split ring radially outwardly substantially into the annular groove in the female coupling member.

* * * * *